(12) United States Patent
Cruz et al.

(10) Patent No.: US 8,882,392 B1
(45) Date of Patent: Nov. 11, 2014

(54) METHOD AND SYSTEM FOR ANCHORING A PIPELINE AT A SUBSEA LOCATION

(75) Inventors: Peter A. Cruz, Katy, TX (US); Terence F. Townend, Houston, TX (US); Jeffrey A. Liggett, Houston, TX (US)

(73) Assignee: Pinnacle Engineering Inc., Houston, TX (US)

( * ) Notice: Subject to any disclaimer, the term of this patent is extended or adjusted under 35 U.S.C. 154(b) by 253 days.

(21) Appl. No.: 13/569,508

(22) Filed: Aug. 8, 2012

(51) Int. Cl.
*F16L 1/16* (2006.01)
*E02D 5/22* (2006.01)

(52) U.S. Cl.
CPC .. *F16L 1/16* (2013.01); *E02D 5/223* (2013.01)
USPC ........................................................ 405/172

(58) Field of Classification Search
USPC ................ 405/154.1, 158, 168.1, 168.4, 172, 405/184.4
See application file for complete search history.

(56) References Cited

U.S. PATENT DOCUMENTS

| | | | |
|---|---|---|---|
| 3,841,106 A | 10/1974 | Blumberg | |
| 4,175,620 A | 11/1979 | Nolan, Jr. et al. | |
| 5,730,552 A | 3/1998 | Johannesson et al. | |
| 6,132,141 A | 10/2000 | Kirk | |
| 6,290,431 B1 * | 9/2001 | Exley et al. | 405/158 |
| 7,654,773 B2 | 2/2010 | Bastard et al. | |
| 2005/0180820 A1 * | 8/2005 | Zandwijk | 405/184.4 |
| 2011/0142543 A1 | 6/2011 | Griffin | |
| 2014/0064855 A1 * | 3/2014 | Hammer et al. | 405/169 |

* cited by examiner

*Primary Examiner* — Sunil Singh
(74) *Attorney, Agent, or Firm* — Egbert Law Offices, PLLC

(57) ABSTRACT

A method of anchoring a pipeline at a subsea location includes the steps of installing a first pile into the subsea location in a position away from the pipeline, affixing a first line to the pipeline and to the first pile, and tensioning the first line from the pipeline. A second pile is installed into the subsea location in a position away from the pipeline and away from the first pile. A second line is affixed to the pipeline and the second pile. The second line is tensioned from the pile. Each of the first and second lines extends on opposite sides of the pipeline at an acute angle relative to a longitudinal axis of the pipeline. Each of the pile is a suction pile having a tensioning mechanism thereon.

14 Claims, 4 Drawing Sheets

METHOD AND SYSTEM FOR ANCHORING A PIPELINE AT A SUBSEA LOCATION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to systems and methods for anchoring pipelines. More particularly, the present invention the relates to systems and methods for anchoring a pipeline wherein the pipeline is effectively isolated from the transmission line. Additionally, the present invention relates to subsea piles having a tensioning mechanism thereon so as to apply a tension force to the pipeline.

2. Description of Related Art Including Information Disclosed Under 37 CFR 1.97 and 37 CFR 1.98

During the production of oil and gas in offshore locations, wells are drilled in various locations in the subsea location. Each of these wells produces a quantity oil and/or gas. Ultimately, the oil and/or gas produced from each of the wells is delivered by various flow lines to the production platform. Ultimately, at the production platform, the gas is transmitted along a gas transmission line to the main pipeline. Conventionally, the gas line is connected to the main gas transmission line through the use of pipeline end termination assembly (PLET).

There are a variety of operations carried out at the subsea location. Often, these pipelines can be in the order of several miles of length. Under certain circumstances, a pipe can be snagged by an anchor, a dredge, or other obstacle. As a result, extreme forces may be applied to the pipeline. Ultimately, when these extreme forces are applied to the pipeline, the pipeline will separate from the PLET in a very damaging manner. Ultimately, this can cause a dislocation of the jumper spool which extends from the PLET to the main transmission line. As a result, expensive repairs are required to the PLET and, possibly, to the gas transmission line. As such, it is important to be able to isolate the gas pipeline from the gas transmission line so as to avoid such problems.

Ultimately, the damaged PLET must be raised to the surface of the body and repaired. Expensive procedures would then be required so as to reinstall the PLET in the subsea location and connect the damaged pipeline back to the PLET. This is a time consuming and very expensive process. As such, a need has developed whereby damage to the PLET is effectively prevented in those circumstances extreme forces are applied to the pipeline.

In the past, various patents have issued with respect to anchoring system for pipelines. Unfortunately, none of these anchoring systems effectively prevent the extreme forces that may be applied to the pipeline from adversely affecting the PLET and adversely affecting the connection with the gas transmission line. For example, U.S. Pat. No. 3,841,106, issued on Oct. 15, 1974 to R. Blumberg, shows a pipeline anchoring system for anchoring an underwater pipeline to the floor of a body of water. The anchor includes elongated members having an inverted U-shaped configuration. An underwater sled is disposed over a pipeline and aligned vertically with respect to a boat. Guide cables between the boat and sled permit lowering of an anchor and its embedment into the floor. Upon setting of an anchor, the buoyancy of the sled is increased and the sled is pulled to a new anchoring location by means of cables attached to the forward end of the sled.

U.S. Pat. No. 4,175,620, issued on Nov. 27, 1979 to Nolan, Jr. et al., teaches a method and apparatus for anchoring an offshore pipeline. The offshore pipeline installation includes a wellhead base and a pipeline anchor connected thereto to form a unit which is lowered onto a seabed. The anchor is pivotably positionable relative to the wellhead base about a vertical axis of a pilot tube. A pin pile is inserted through the tube and into the seabed to isolate the pipeline anchor from the wellhead and wellhead base in relation to forces generated in anchoring a pipeline to the pipeline anchor. The anchor is selectively positionable for alignment with pipeline means to be laid. A socket is operable to receive pipeline means laid away from the anchor.

U.S. Pat. No. 5,730,552, issued on Mar. 24, 1998 to Johannesson et al., shows a pipeline anchor apparatus that provides left and right anchor units with a tie-down strap. The strap prevents the pipeline from floating in wet conditions.

U.S. Pat. No. 6,132,141, issued on Oct. 17, 2000 to W. D. Kirk, provides a pipeline buoyancy control assembly and tie-down attachment. Anchor rods are driven partially into the ground along opposite lateral sides of the pipeline. The tie-down attachment members are disposed on and mounted to upper end portions of the anchor rods with each tie-down attachment member having a tubular mounting body defining an axial passageway through which the upper end of one anchor rod extends and a retainer body disposed in an oblique relation and attached to the tubular mounting body.

U.S. Pat. No. 7,654,773, issued on Feb. 2, 2010 to Bastard et al., provides a system and method for installing a subsea pipeline. An anchor is installed in the seabed and include one or more sheaves. The pipeline is provided with one or more coupling devices situated remotely from the anchor relative to a target area. A winch wire can be provided and is adapted to be directly or indirectly coupled at least a portion of the target area to the pipeline. A transfer sling having a pull wire and an initiation wire can be coupled between the winch wire and pipeline to assist the winch wire so as to pull the pipeline into the target area and transferring a pipeline force from the sheave to the anchor independent of the sheave.

U.S. Patent Publication No. 2010/0142543, published on Jun. 16, 2011 to J. E. Griffin, teaches a method of using a sacrificial pipe string. This method includes lowering a first end of a flowpipe from the vessel. The pipeline end termination is connected to a second end of the flowpipe. A first end of a sacrificial pipe is connected to the pipeline end termination. A winch wire is connected to a second end of the sacrificial pipe. The sacrificial pipe is lowered with the winch wire so that the pipeline end termination rests on the sea floor. The sacrificial pipe is then disconnected from the pipeline end termination.

It is an object of the present invention to provide a pipeline anchoring system which serves to prevent any damage to the pipeline end termination.

It is another object of the present invention to provide a pipeline anchoring system which minimizes the potential of damage to the gas transmission line as a result of excessive forces being applied to the gas pipeline.

It is another object of the present invention to provide a pipeline anchoring system which assures that the gas pipeline will break rather than transmit damaging forces to the pipeline end termination.

It is another object of the present invention to provide a pipeline anchoring system which is easy to install.

It is still a further object of the present invention to provide a pipeline anchoring system in which the pipeline can be anchored through the use of a remotely-operated vehicle.

These and other objects and advantages of the present invention will become apparent from a reading of the attached specification and appended claims.

BRIEF SUMMARY OF THE INVENTION

The present invention is a method of anchoring a pipeline. This method includes the steps of: (1) installing a first pile into the subsea location in a position away from the pipeline; (2) affixing a first line to the pipeline; (3) affixed the first line to the first pile; and (4) tensioning the first line from the pipeline. The method of present invention further includes the steps of installing a second pile into the subsea location in a position away from the pipeline and away from the first pile. A second line is affixed to the pipeline and affixed the second pile. The first line extends at an acute angle relative to a longitudinal axis of the pipeline on one side of the pipeline. The second line extends at an acute angle relative to a longitudinal axis on an opposite side of the pipeline. The acute angle of first line is approximately equal to the acute angle of the second line.

The step of affixing the first line to the pipeline includes the step of affixing an anchor clamp to the pipeline and affixed the first line to a flange of this anchor clamp. The step of tensioning the first line includes tensioning the first line to a tension greater than the tensile strength of the pipeline.

The pipeline is connected to a pipeline end termination assembly at the subsea location. The first line is affixed to the pipeline of a position in spaced relationship to this pipeline end termination. A tubular member is connected between the pipeline end termination and a transmission line. The pipeline is connected to the pipeline end termination at a position different than a position that the tubular member is connected to the pipeline end termination.

Each of the first and second piles is a suction pile. This suction pile has a channel formed on a top surface thereof. The suction pile has a carriage positioned in the channel. The first line has an end affixed to the carriage in the channel of the first pile. The carriage is moved along the channel an a direction away from the pipeline. The carriage is cooperative with an actuator. The actuator has in end extending outwardly of the channel. An ROV is moved into a position adjacent the end of the actuator. The end of the actuator is torqued by the ROV so as to cause the carriage to move in direction away from the pipeline.

The present invention is also a system for anchoring a pipeline that comprises a pipeline having an anchor affixed to a surface thereof, a pipeline end termination affixed to an end of the pipeline, a first pile positioned in spaced relation to the pipeline and to the pipeline end termination, and a first line to affixed to the anchor of the pipeline. The pile has a first tensioning means thereon. The first line is affixed to the first tensioning means of the first pile. The first tensioning means serves to apply a tension to the first line.

The first pile is positioned on one side of the pipeline. A second pile is positioned in spaced relationship to the pipeline and to the pipeline end termination. The second pile has a second tensioning means thereon. The second pile is positioned on an opposite side of the pipeline. A second line is affixed to the anchor of the pipeline and affixed to the second tensioning means of the second pile. The second tensioning means also serves to apply a tensioning force to the second line. The first line extends at an cute angle with respect to the longitudinal axis of the pipeline. The second line also extends an acute angle relative to the longitudinal axis of the pipeline. The tensioning means serves to apply a tension to the first line and the second line greater than a tensile strength of the pipeline.

Each of the first and second piles is a suction pile having a channel formed at a top surface thereof. A carriage is positioned in the channel. The line has an end affixed to this carriage. An actuator is cooperative with the carriage so as to move the carriage along the pipeline.

A tubular member has one affixed to the pipeline end termination in a location different than a location that the pipeline is affixed to the pipeline end termination. A transmission line is connected to an opposite end of the to the tubular member.

The present invention is also a suction pile apparatus that comprises a pile having a top surface which is suitable for installation in a subsea location, a channel extending along a top surface of the pile, a carriage translatably positioned relative to the channel, and an actuator cooperative with the carriage. The carriage has a connector extending into the channel. The actuator is suitable for moving the carriage and the connector thereof along the channel. The actuator has an end extending outwardly of the channel. This end is suitable for grasping by a remotely operated vehicle. A line is affixed to the connector of the carriage. The line has a portion extending along a portion of the channel. The line has another portion extending outwardly of the pile.

The foregoing Summary of the Invention is intended to describe the preferred embodiment of the present invention. This section is not intended to be limiting, in any way, of the scope of the present invention. The scope of the present invention is to be limited by the following claims and their legal equivalents.

DETAILED DESCRIPTION OF THE INVENTION

Figure 1:
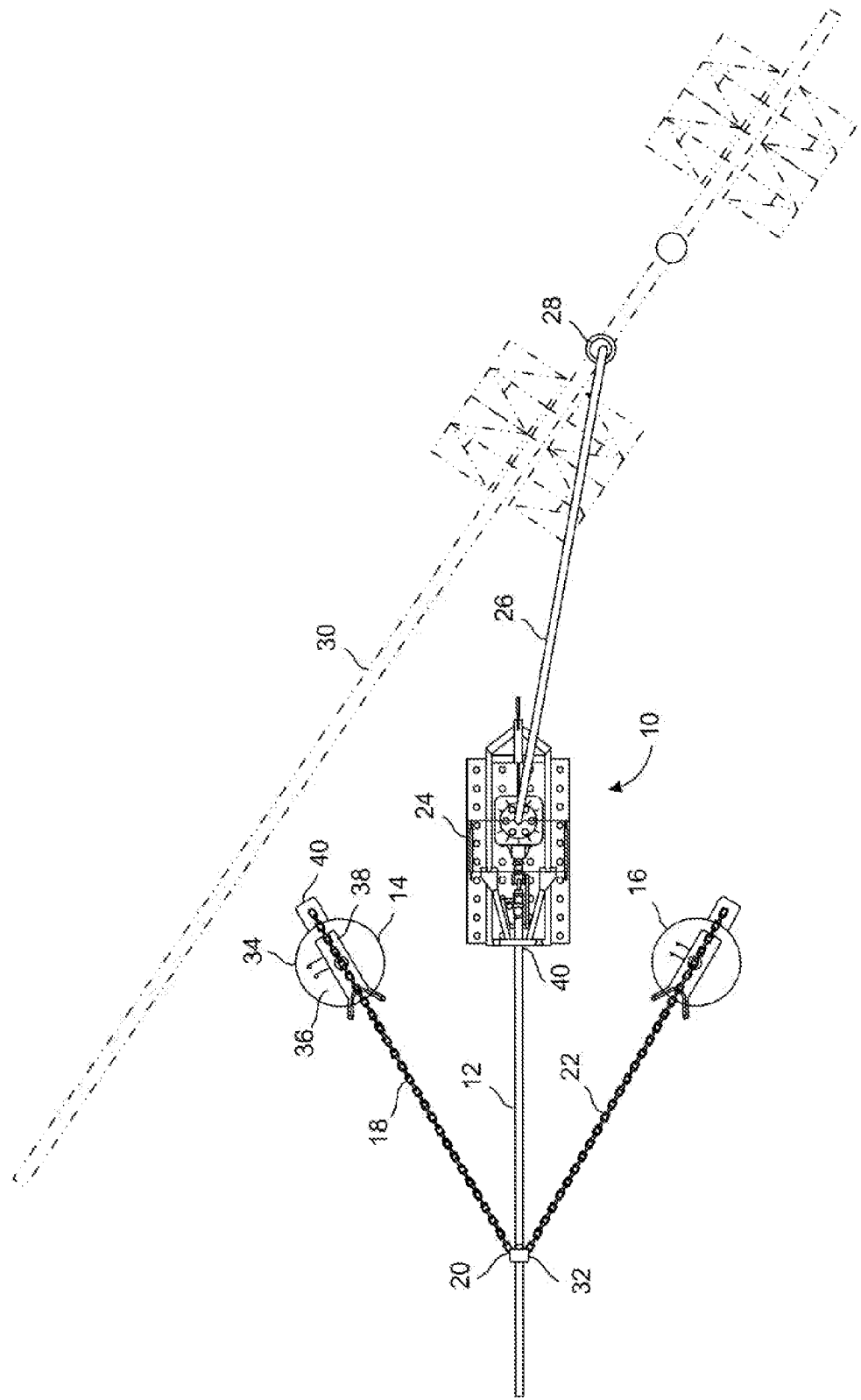
FIG. 1 is a plan view showing the pipeline anchoring system of the present invention.

Referring to FIG. 1, there is shown the pipeline anchoring system 10 in accordance with the preferred embodiment of the present invention. The pipeline anchoring system 10 includes a pipeline 12 having a longitudinal axis. There is a first pile 14 and a second pile 16 positioned on opposite sides of the pipeline 12. A line 18 extends from the first pile 14 to an anchor 20 affixed to the pipeline 12. The second pile 16 has a line 22 extending therefrom to the anchor 20 on the pipeline 12. A pipeline end termination assembly 24 is affixed to the end of the pipeline 12. A tubular member 26 is connected to the pipeline end termination assembly 24 at a location different than the location that the pipeline 12 is connected to the pipeline end termination assembly 24. The tubular member 26 is connected at 28 to a main gas transmission line 30.

The pipeline 12 is in the nature of a gas sales line. Typically, the pipeline 12 will extend for a significant length. In certain circumstances, the pipeline 12 can extend up to several miles. The anchor 20 includes a clamp 32 having flanges extending outwardly from the sides thereof. Clamp 32 is installed onto the pipeline 12 in a position away from the pipeline end termination assembly 24.

The first pile 14 is a suction pile. The suction pile 14 is a thin-walled steel cylinder which is closed at least one longitudinal end. This suction pile is placed into the seabed and penetrates the subsea soil with the aid of suction (underpressure) created within the cylinder 34 of the suction pile 14. The creation of the suction can be with the aid of a suction source, such as a pump, that is mounted on, close to, or at a distance (e.g. above the water surface, e.g. at a vessel) from the suction pile. Typically, the suction pile is lowered from the water surface to the sea floor. The interior of the cylinder 34 can have a vacuum therein. Pressure within the cylinder 34 can be reduced by operating a pumping unit so as to cause the cylinder 34 to penetrate into the sea floor to a desired depth. Subsequently, the operation of the pumping unit is stopped and the pumping unit can be disconnected from the cylinder 34 and raised to the water surface in order to recover it. As such, the top surface 36 of the suction pile 14 will reside a small distance above the sea floor.

In FIG. 1, it can be seen that the first pile 14 has a channel 38 placed at the top surface 36 of the cylinder 34. An actuator 40 extends outwardly beyond the cylinder 34. Actuator 40 is in a position suitable for manipulation by a remotely-operated vehicle (ROV). As will be described hereinafter, the channel 38 includes a carriage located therein. An end of the line 18 is affixed to the carriage. As such, the manipulation of the actuator 40 will cause the carriage to move away from the pipeline 12 so as to cause a tension force to be applied to the line 18.

The second pile 16 is also a suction pile having a similar configuration to that of the first pile 14. The second line 22 is connected to the carriage of the second pile 16 in the manner described hereinabove. Once again, a tension force can be applied to the second line 22.

In FIG. 1, it can be seen that the first pile 14 is positioned away from the pipeline 12 and also away from the pipeline end termination assembly 24. The first pile 14 is positioned on one side of the pipeline 12. The line 18 extends at an acute angle with respect to longitudinal axis of the pipeline 12. The second pile 16 is positioned on the other side of the pipeline 12. The second pile 16 is spaced away for the pipeline 12 and also away from the pipeline end termination assembly 24. The line 22 will extend at an acute angle relative to the longitudinal axis of the pipeline 12. The acute angle of the line 18 with respect to pipeline 12 and the acute angle of the line 22 with respect to pipeline 12 will be approximately equal.

As used herein, the term "line" is applied to lines 18 and 22 can refer to chains, cables, wire ropes, and other similar structures. Ultimately, the combined forces exerted by the tensioning mechanisms associated with the first pile 14 and the second pile 16 will be greater than the tensile strength of the pipeline 12.

In operation, the first pile 14 and the second pile 16 are placed on the sea floor in a location adjacent to the pipeline end termination assembly 24. The lines 18 and 22 are respectively affixed to the carriages of the each piles 14 and 16 and also affixed to the anchor 20 of the pipeline 12. The tensioning mechanism serves to create a tension in the lines 18 and 20.

With reference to FIG. 1, the system of the present invention prevents any excessive forces that are applied to the pipeline 12 from adversely affecting the pipeline end termination assembly 24 and from adversely affecting the connection of the pipeline end termination assembly 24 with the gas transmission line 30. In other words, if an anchor should advertently contact the pipeline 12 in a location away from the pipeline end termination assembly 24 and away from the anchor 20, the pipeline 12 will have a tendency to deflect and bend. Without the system of the present invention, this bending would serve to eventually destroy the connection between the end 40 and the pipeline end termination assembly 24. Ultimately, such forces could cause a dislocation of the pipeline end termination assembly 24 and potentially destroy the connection between the tubular member 26 and the gas transmission line 30. However, in the present invention, the forces exerted by the lines 18 and 22 upon the anchor 20 will cause the deflection away from the connection 40 with the pipeline end termination assembly 24. Ultimately, if enough force applied to the pipeline 12, the pipeline 12 will break in a location away from the anchor 20. Suitable shutoff mechanisms associated with the production platform will prevent any release of gas into the subsea environment. Typically, such platforms include "low pressure" sensors which automatically act to close the valves associated with pipeline 12 in the event of a low pressure condition. As such, the present invention effectively prevents any damage from adversely affecting the pipeline end termination assembly 24 and the connection of the tubular member 26 with the gas transmission line 30. After the damage has occurred, the remaining portion of the pipeline 12 can be removed from the connection 40 with the pipeline end termination assembly 24 and a new pipeline attached thereto. The present invention avoids any need to return the pipeline end termination assembly 24 to the surface for repair. The present invention also avoids the expensive subsea repairs.

The tubular member 26 is in the nature of a jumper that extends from the pipeline end termination assembly 24 to the gas transmission line 30. Typically, the tubular member 26 is suitably flexible.

Figure 2:
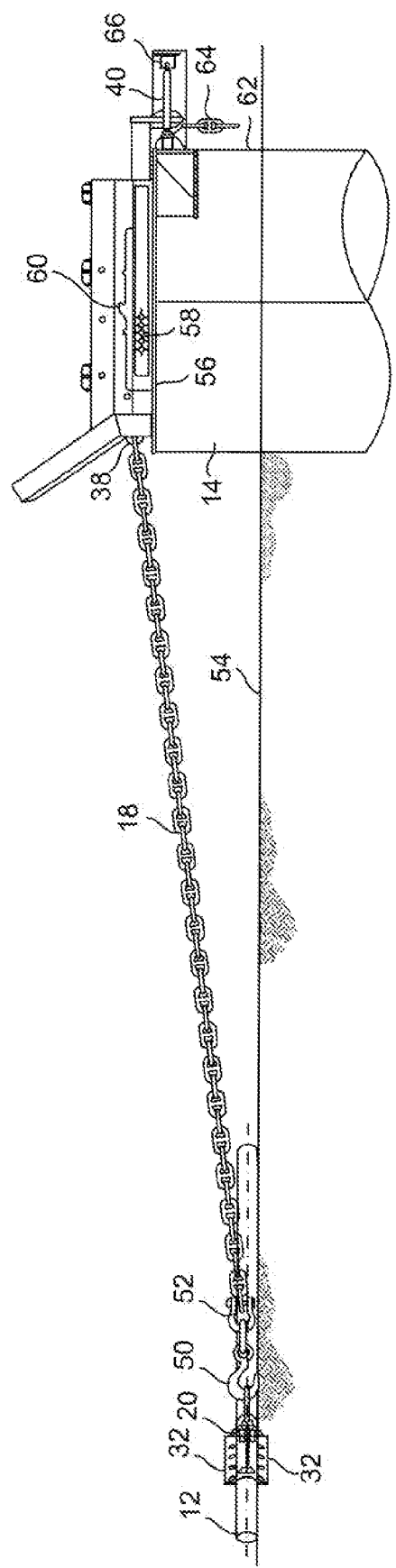
FIG. 2 is a side elevational view showing the pipeline anchoring system of the present invention.

FIG. 2 is an isolated view showing the connection of the chain 18 between the first pile 14 and the anchor 20 on the pipeline 12. The anchor 20 includes suitable flanges 32 extending therefrom. The anchor 20 can be clamped, in a conventional manner, to the surface of the pipeline 12. A hook 50 is connected to the anchor 20. Hook 50 includes a clevis 52 that is joined to the line 18. The line 18 is illustrated as being a chain. The chain extends from the anchor 20 at an acute angle above the sea floor 54. Ultimately, the opposite end of the line 18 is received within the channel 38 formed at the top 56 of the first pile 14.

The channel 38 has a carriage 58 positioned therein. Carriage 58 has a connector 60 extending upwardly therefrom. Connector 60 can be joined to the end of the line 18. The actuator 40 is illustrated as extending beyond the side 62 of the pile 14. Ultimately, it can be seen in FIG. 2, the end 64 of the chain 18 extends entirely along the channel 38 so as to have a portion extending outwardly at the side 62 of the pile 14. The actuator 40 includes an end 66 that is suitable for cooperation with a torquing tool of an ROV.

Figure 3:
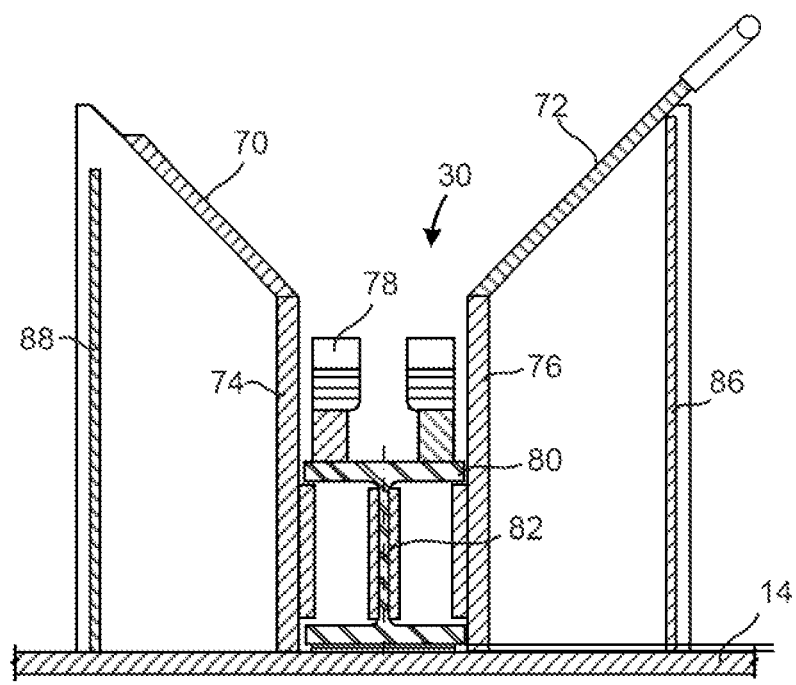
FIG. 3 is a cross-sectional view showing the channel and carriage associated with the suction pile as used in the anchoring system of the present invention.

FIG. 3 shows the details associated with the channel 30 at the top of the pile 14. Channel 30 is defined by inclined walls 70 and 72. Walls 70 and 72 converge toward the center of the channel 30. Wall 70 extends to a side 74. Wall 72 extends to a side 76. A claw or clamping mechanism 78 extends upwardly above an I-beam 80. The clamps or claws 78 are in the nature of a connector suitable for joining to the line 18. The I-beam 80 resides within a lower portion of the channel 30. The travel of the I-beam 80 is defined by the sides 74 and 76 and also defined by a inner channel 82. As such, the connector 78 along with the I-beam 80 serves as the "carriage" of the present invention. Upright members 84 and 86 respectively support the walls 70 and 72 a proper distance above the top of the first pile 14. The second pile 16 will have a similar configuration to that shown in FIG. 3.

Figure 4:
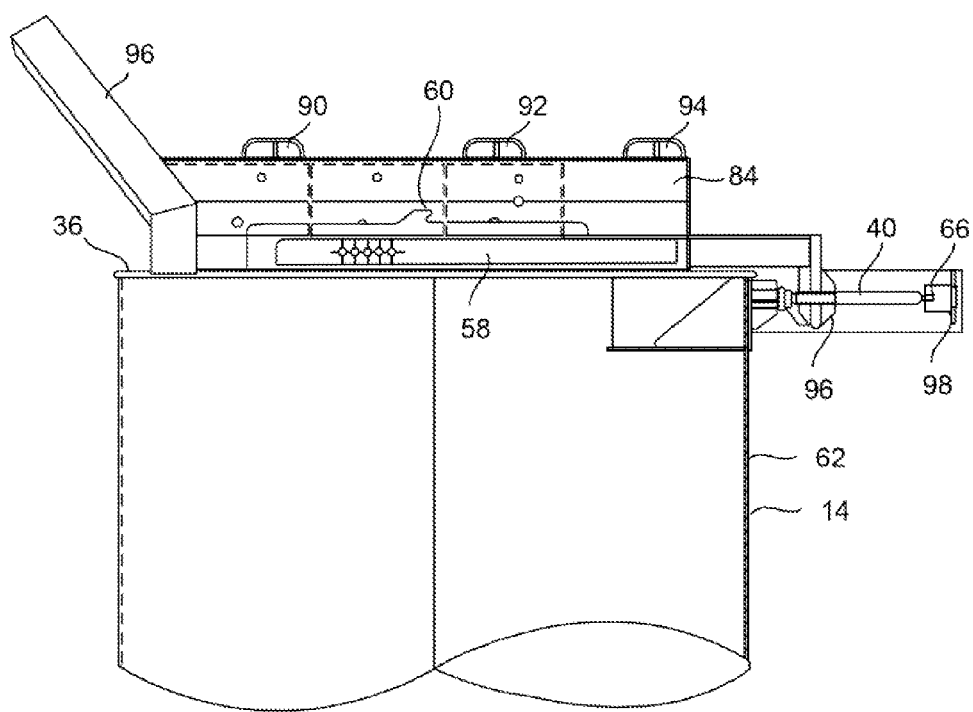
FIG. 4 is a side elevational view of the channel and carriage associated with the suction pile of anchoring system of the present invention.

FIG. 4 shows a side view of the structure at the top of the pile 14. As can be seen, the side 86 supports the walls 70 and 72 in the manner described hereinbefore in association with FIG. 3. Suitable handles 90, 92 and 94 extend upwardly above the upright 84. Handles 90, 92 and 94 can be manipulated by an ROV during the placement of the pile 14 at the subsea location. A beam 76 extends upwardly from the top surface 36 of the first pile 14. Beam 96 further serves as a guide for the placement of the line 18 within the channel.

The carriage 58 is slidably positioned adjacent to the top surface 36 of the first pile 14. The carriage 56 includes a connector 60. Connector 60 serves to rigidly affix the line 18. The actuator 40 extends outwardly from the side 62 of the first pile 14. Actuator 40 can be in the nature of a threaded rod. A suitable nut 96 is positioned on the actuator 40. As such, the rotation of the actuator 40 will serve to move the nut 96 and its attached carriage 58 along the channel 38. The actuator 40 includes an end 66 opening within a bucket 98. Bucket 98 serves to receive the torque tool of an ROV therein. The torque tool can engage the end 66 of the actuator 40 so as to rotate the actuator 40 and to the move the carriage 58 longitudinally along the channel. This serves to effectively tension the line 18 to a desired amount of tension.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A method of anchoring a pipeline to a subsea location, the pipeline having a tensile strength, the method comprising:
    installing a first pile into the subsea location in a position away from the pipeline;
    affixing a first line to the pipeline;
    affixing said first line to said first pile;
    installing a second pile into the subsea location away from the pipeline and away from said first pile;
    affixing a second line to the pipeline;
    affixing said second line to said second pile;
    tensioning said first line from said first pile to a tension greater than the tensile strength of the pipeline; and
    tensioning said second line from said second pile.

2. The method of claim 1, said pipeline having a longitudinal axis, said first line extending at an acute angle relative to the longitudinal axis of the pipeline on one side of the pipeline, said second line extending at an acute angle relative to the longitudinal axis of the pipeline on an opposite side of the pipeline.

3. The method of claim 2, the acute angle of said first line being approximately equal to the acute angle of said second line.

4. The method of claim 1, the step of the affixing said first line to the pipeline comprising:
    affixing an anchor clamp to the pipeline, said anchor clamp having a flange extending therefrom; and
    affixing a first line to said flange of said anchor clamp.

5. The method of claim 1, further comprising:
    connecting the pipeline to a pipeline end termination assembly at the subsea location, said first line being affixed to the pipeline at a position in spaced relation to said pipeline end termination.

6. The method of claim 5, further comprising:
    connecting a tubular member between said pipeline end termination and a transmission line, said pipeline being connected to said pipeline end termination at a position different than a position that said tubular member is connected to said pipeline end termination.

7. The method of claim 1, each of said first and second piles being a suction pile, the suction pile having a channel formed on a top surface thereof, the suction pile having a carriage positioned in said channel, the step of affixing said first line to said first pile comprising:
    affixing an end of said first line to said carriage in said channel of said first pile.

8. The method of claim 7, the step of tensioning comprising:
    moving said carriage along said channel in a direction away from the pipeline.

9. The method of claim 8, said carriage being cooperative with an actuator, said actuator having an end extending outwardly of said channel, the step of tensioning further comprising:
    moving an remotely-operated vehicle to a position adjacent said end of said actuator; and
    torquing said end of said actuator by said remotely-operated vehicle so as to cause said carriage to move in direction away from said pipeline.

10. A system comprising:
    a pipeline having an anchor affixed to a surface thereof, said pipeline having a longitudinal axis, said pipeline having a tensile strength;
    a pipeline end termination affixed to an end of said pipeline;
    a first pile positioned in spaced relation to said pipeline and to said pipeline end termination, said first pile having a first tensioning mechanism thereon; and
    a first line affixed to said anchor of the pipeline and affixed to said first tensioning mechanism of said first pile, said first tensioning mechanism applying a tension to said first line greater than the tensile strength of said pipeline.

11. The system of claim 10, said first pile positioned on one side of said pipeline, the system further comprising:
    a second pile positioned in spaced relation to said pipeline and to said pipeline end termination, said second pile having a second tensioning mechanism thereon, said second pile positioned on an opposite side of said pipeline; and
    a second line affixed to said anchor of said pipeline and affixed to said second tensioning mechanism of said second pile, said second tensioning mechanism applying a tension to said second line greater than the tensile strength of said pipeline.

12. The system of claim 11, said first line extending at an acute angle with respect to said longitudinal axis of said pipeline, said second line extending an acute angle with respect to said longitudinal axis of said pipeline.

13. The system of claim 10, said first pile being a suction pile having a channel formed at a top surface thereof, said first pile further comprising:
- a carriage positioned in said channel, said first line having an end affixed to said carriage; and
- an actuator cooperative with said carriage so as to move said carriage along said channel.

14. The system of claim 10, further comprising:
- a tubular member having one affixed to said pipeline end termination at a location different than a location that said pipeline is affixed to said pipeline end termination; and
- a transmission line connected to an opposite end of said to said tubular member.

* * * * *